UNITED STATES PATENT OFFICE.

ERNST ULRICHS, OF ELBERFELD, GERMANY, ASSIGNOR TO COMPANY WÜLFING, DAHL & CO., A. G., OF BARMEN, GERMANY.

COLOR-LAKE AND PROCESS OF MANUFACTURING SAME.

1,028,239.  Specification of Letters Patent.  Patented June 4, 1912.

No Drawing. Original application filed August 15, 1911, Serial No. 644,116. Divided and this application filed January 16, 1912. Serial No. 671,486.

*To all whom it may concern:*

Be it known that I, ERNST ULRICHS, a subject of the King of Prussia, and resident of Elberfeld, Province of the Rhine, Germany, have invented certain new and useful Improvements in Color-Lakes and Processes of Manufacturing Same, of which the following is a specification.

This invention relates to improvements in color lakes and in the process of manufacturing the same.

According to the present invention the new color lakes are obtained by treating the monoazo dyes produced from diazotized anilin and naphtholsulfonic acid 1:4 with one of the salts of the heavy metals such as calcium, barium or the like. The following examples of the method of producing such lakes are given by way of example:

Example I: A paste containing 3 kilograms of the dry dye obtained in known manner from diazotized anilin and naphtholsulfonic acid 1:4 is carefully stirred with an aqueous suspension of 100 kilograms of heavy spar. A solution of half a kilogram of calcium chlorid is then added and the whole boiled for a few minutes. The color-lake thus obtained is of a nice and clear orange-red shade.

Example II: The process is carried out in a similar manner to that of Example I but instead of using calcium chlorid, one kilogram of barium chlorid is used. The lake thus obtained is of a slightly redder shade than the lake obtained by Example I.

The color lakes obtained by the dye produced from diazotized anilin and naphtholsulfonic acid 1:4 exhibit a beautiful and clear shade, are proof against water and alcohol and insoluble in oil, while the oil colors which may be made therefrom are very fast against the action of light and of excellent covering capacity.

The new lakes are characterized by yielding anilin and 2-amido-naphtholsulfonic acid 1:4 on reduction by means of tin and hydrochloric acid.

It will of course be understood that in the foregoing examples, any other suitable substrata such as aluminum hydroxid, permanent white or the like may be used instead of heavy spar.

The lakes may also be manufactured under such conditions that the dye is formed simultaneously with the precipitation of the lake, as described in the specification of the prior United States Patent No. 910030.

I claim:—

1. A process of manufacturing color lakes, which consists in treating the dye produced from diazotized anilin and naphtholsulfonic acid 1:4 with a salt of a heavy metal.

2. A process of manufacturing color lakes, which consists in treating the dye produced from diazotized anilin and naphtholsulfonic acid 1:4 with a calcium salt.

3. As new articles of manufacture, color lakes obtained from the dye produced from diazotized anilin and naphtholsulfonic acid 1:4 characterized by their orange-red shade, their resistance to water and alcohol, their insolubility in oil and their fast color against the action of light and yielding anilin and 2 amido naphtholsulfonic acid 1:4 on reduction by means of tin and hydrochloric acid.

4. As a new article of manufacture, a color lake obtained from the calcium salt of the dye produced from diazotized anilin and naphtholsulfonic acid 1:4 characterized by its orange-red shade, its resistance to water and alcohol, its insolubility in oil and its fast color against the action of light and yielding anilin and 2 amido naphtholsulfonic acid 1:4 on reduction by means of tin and hydrochloric acid.

In witness whereof I have hereunto set my hand in the presence of two witnesses.

ERNST ULRICHS. [L. S.]

Witnesses:
 CHAS. J. WRIGHT,
 ALBERT NUFER.